Aug. 2, 1938.  G. H. ZOUCK  2,125,326

ENGINE TENDER BUFFER MECHANISM

Filed Aug. 22, 1933  6 Sheets-Sheet 1

INVENTOR
George H. Zouck
BY
ATTORNEYS

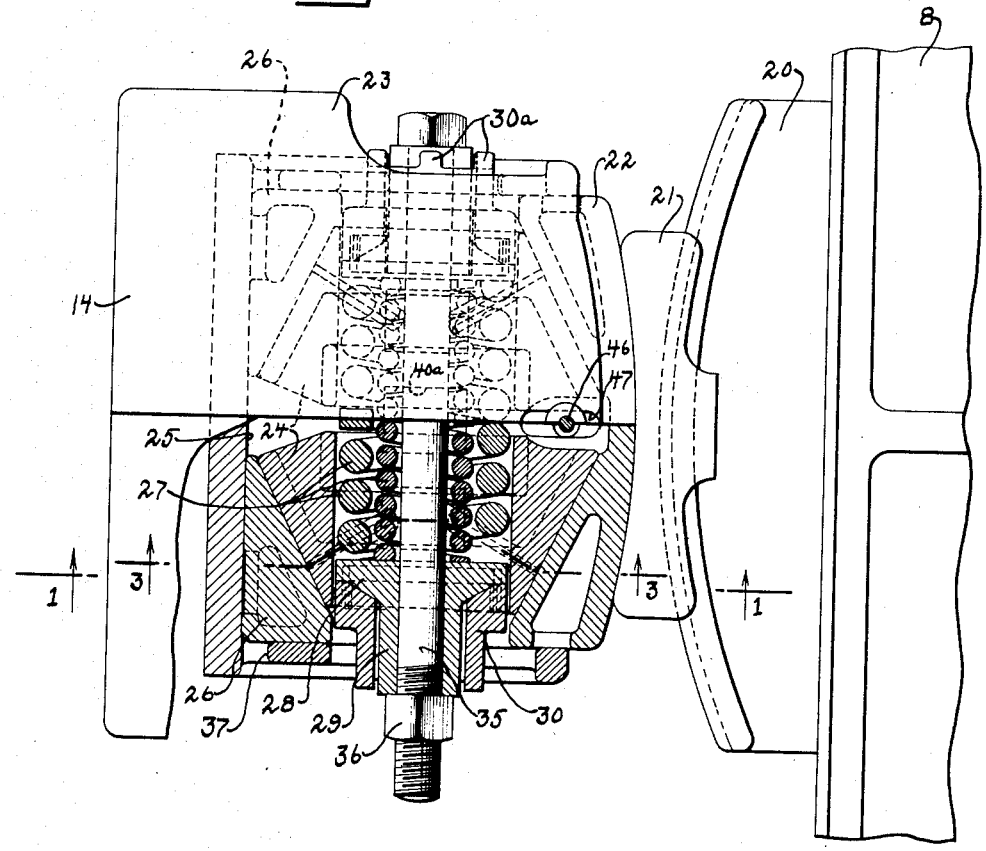
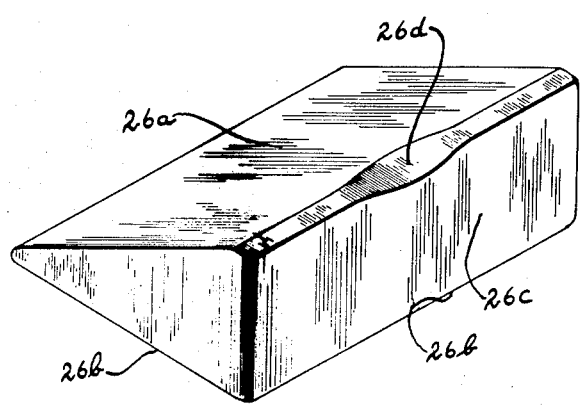
Fig. 2.
Fig. 6a.

Aug. 2, 1938.   G. H. ZOUCK   2,125,326
ENGINE TENDER BUFFER MECHANISM
Filed Aug. 22, 1933    6 Sheets—Sheet 3

INVENTOR
George H. Zouck
BY
ATTORNEYS

Aug. 2, 1938.  G. H. ZOUCK  2,125,326
ENGINE TENDER BUFFER MECHANISM
Filed Aug. 22, 1933  6 Sheets-Sheet 4

INVENTOR
George H. Zouck
BY
ATTORNEYS

Aug. 2, 1938.          G. H. ZOUCK          2,125,326
ENGINE TENDER BUFFER MECHANISM
Filed Aug. 22, 1933          6 Sheets-Sheet 5

INVENTOR
George H. Zouck
BY
ATTORNEYS

Aug. 2, 1938.                 G. H. ZOUCK                  2,125,326
                    ENGINE TENDER BUFFER MECHANISM
                       Filed Aug. 22, 1933          6 Sheets—Sheet 6

Patented Aug. 2, 1938

2,125,326

UNITED STATES PATENT OFFICE 2,125,326

ENGINE-TENDER BUFFER MECHANISM

George H. Zouck, Orange, N. J., assignor to Franklin Railway Supply Company, New York, N. Y., a corporation of Delaware Application August 22, 1933, Serial No. 686,203

16 Claims. (Cl. 213—3)

This invention relates to engine-tender interconnections and is especially concerned with an interconnection which includes a draw-bar and what has become known in the art as a "radial" buffer, that is, a buffer including a buffing member carried by the engine and a buffing member carried by the tender with a floating member interposed between the buffing members, which are curved in vertical planes on radii whose centers coincide with the pins serving to couple the drawbar with the two vehicles.

Before going into the objects of the invention and the structure by means of which the objects are accomplished, reference is first made to some more or less general considerations such as problems encountered heretofore, so that the general nature of this invention may appear to the best advantage.

In the first place, attention is directed to the fact that it is desirable (although this condition has not been fully realized in prior constructions) to maintain the engine and its tender as a relatively rigid unit except for angular and parallel disalignment necessary to take care of curved and irregular trackway. This is of importance for many reasons, including safety for the engine crew. In connection with this point, it is here noted that one of the primary objects of the invention is the provision of a buffer construction which normally maintains the drawbar under tension and which further minimizes fluctuations in the tension strain imposed on the draw-bar. The present construction is of further importance since it reduces shocks and strains on the draw-bar.

In bringing out another feature of this invention, it is noted that buffers heretofore employed have quite regularly required inspection and attention, such as special lubrication or adjustment between the regular intervals of locomotive inspection. For reasons which are brought out more fully hereinafter, the present construction eliminates the necessity for any inspection, replacement or adjustment except at the regular intervals of locomotive inspection. This particular problem has arisen heretofore for various reasons, principally because of the fact that the wearing surfaces of the movable buffer parts have been so restricted or limited in area that the rate of wear has been excessive. The problem, however, is complicated by the fact that there are a number of standard clearance and other limitations beyond which the buffer cannot be extended. With this in mind, the present construction has been so worked out and the parts thereof specially configured in a manner to greatly increase wearing surfaces of at least some of the movable buffer parts. This is especially true of the movable wedge devices to be described more fully hereinafter and, as an example of the increased area of wearing surface provided in accordance with this invention, it is noted that the arrangement of the parts is such as to afford at least double the area heretofore possible within the same overall buffer dimensions.

I have also found by actual test in service that it is important that the area of the wearing surfaces on the movable wedges of the buffer structure be equal to or more preferably somewhat greater than the area of the floating chafing block normally provided between the two opposed buffing members mounted on the engine and tender. This relationship of areas is provided by the special arrangements above referred to without encroaching on clearance limitations and, indeed, without necessitating any increase in the overall dimensions of a buffer adapted to any particular class of service.

Still another feature which is of importance and which is taken care of in accordance with this invention is maximum convenience in coupling and uncoupling the draw-bar and in removing, replacing or adjusting buffer parts. The buffer construction hereinafter described may be taken apart and its force removed from the drawbar without employing an extra engine, as has frequently been necessary with prior arrangements.

In addition to all the foregoing, the arrangement of the present invention provides a rigid and sturdy construction which is convenient to inspect and which is, furthermore, equipped with a novel type of lubricating means so that proper lubrication may conveniently be effected at any time desired or at the normal periods of engine inspection.

The several features and advantages of the present construction will be brought out more fully herebelow after a consideration of the accompanying drawings which illustrate several different embodiments of the invention.

Figure 2 is a plan view of portions of the buffer mechanism of Figure 1, with certain parts shown in horizontal section;

Figure 6a is a detail view of a wedge block employed;

Figure 1:
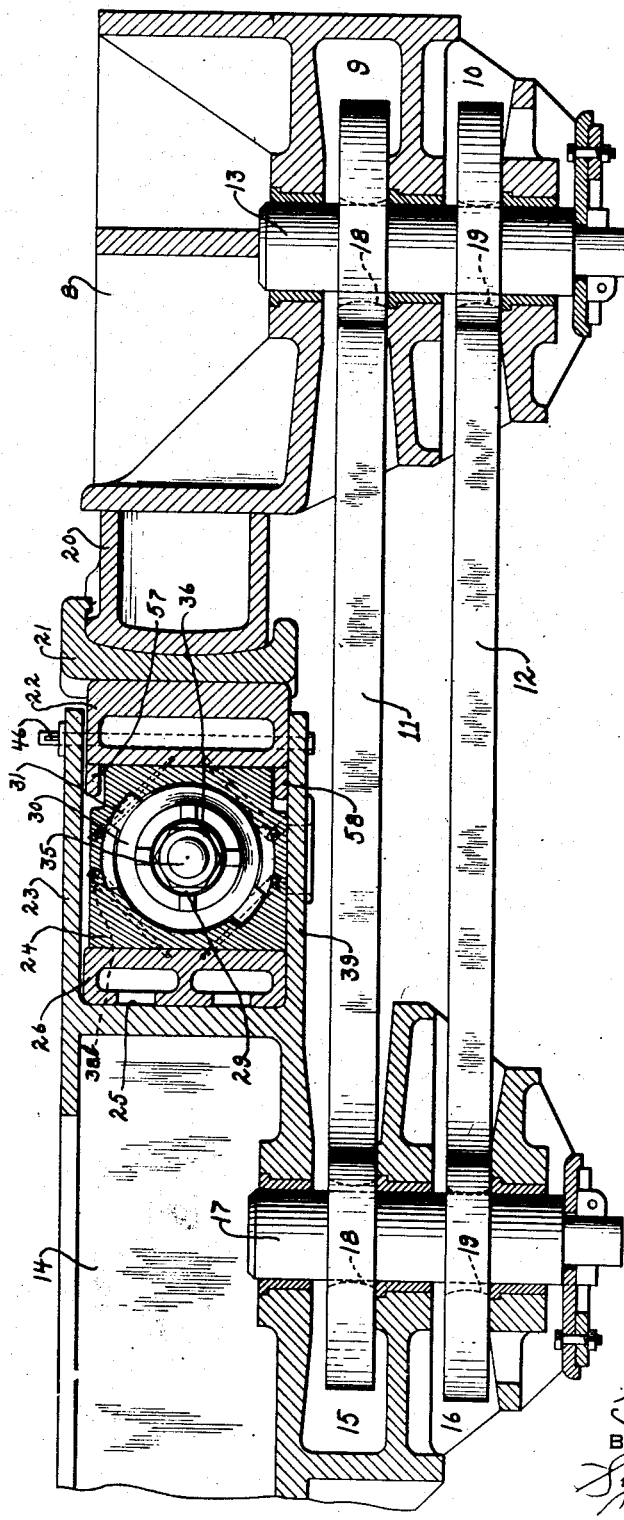
Figure 1 is a side view of portions of engine and associated tender frames, with a draw-bar interconnection therebetween and with one form of buffer mechanism constructed in accordance with this invention shown in vertical section, as indicated by the section line 1—1 on Figure 2.

Reference is first made to Figures 1 and 2 in which a portion of an engine frame appears at 8. This frame is provided with pockets 9 and 10 which serve to receive the forward ends of the service and auxiliary draw-bars 11 and 12. It will be seen that draw-bar pin 13, passing through apertures in the ends of the bars 11 and 12, serves to retain the bars in the pockets 9 and 10. The tender frame 14 is provided with corresponding pockets 15 and 16 for the other ends of the bars 11 and 12, draw-bar pin 17 serving to complete the engine-tender draft connection. The apertures 18 and 19 at the ends of the draw-bars 11 and 12, respectively, are of slightly larger diameter than the diameter of pins 13 and 17, as clearly shown, and, in accordance with commonly adopted practice, the spacing between the apertures 19 of the auxiliary or emergency bar 12 is somewhat greater than the spacing between the apertures 18 in the service bar 11. Thus, the service bar normally serves to transmit the pull from the engine to the tender and therethrough to the cars of the train, the emergency bar coming into operation only in the event of failure of the service bar. It will be understood, of course, that the buffer construction more fully described hereinafter is entirely suitable and applicable to other draw-bar arrangements.

The buffer mechanism, of course, is mounted between the engine and tender frames and the several parts thereof include a buffer member 20 carried by the engine frame and, in turn, supporting a movable chafing block 21. A buffer member 22 is carried on the tender frame in the manner to be described hereinafter and from the drawings it will be seen that members 20, 21 and 22 have surfaces which are curved generally transversely of the engine and tender, the degree of curvature being such that the draw-bar pins 13 and 17 constitute the centers of curvature.

Referring now to Figures 1 to 4 inclusive, the tender frame carries a pocket 23 into which the buffer member 22 extends. From examination of Figure 2 it will be seen that member 22 has a pair of oppositely inclined wedge surfaces which cooperate with complementary surfaces of the wedge devices 24. Wedge devices 24 are interposed between the buffer member 22 and the base 25 of the pocket and, as here shown, additional wedge members 26 are positioned in the rear corners of the pocket and provided with inclined surfaces which are complementary to the inclined surfaces on the rear faces of the wedges 24.

In the particular embodiment under consideration, the several complementary and co-acting wedge surfaces are inclined in such manner that lateral outward movement of the wedges causes the buffer member 22 to be advanced away from the tender frame so as to bear against the chafing block and, of course, exert pressure against the buffer member 20 carried on the engine frame. Resilient means such as the springs 27 react between the two wedges and constantly urge them away from each other so as to advance the buffer member 22, as just mentioned. In the form of construction shown in Figures 1 to 4 inclusive, however, the springs do not directly bear on the wedges but, on the other hand, act through abutments 28 formed as external flanges on sleeves 29. The abutments 28, in turn, bear against bayonet lock members 30 having locking projections 31 adapted to be moved into and out of engagement with complementary parts 32 formed on the wedges themselves (see Figure 4). This construction is perhaps most clearly illustrated in Figures 1 and 4, from which it will readily be understood that upon rotation of the bayonet member 30 in a counter-clockwise direction to an extent sufficient to bring the projections 31—31 to a roughly vertically aligned position, the bayonet member may be laterally withdrawn. Apertures 33 are provided in the side walls 34 of the buffer pocket to permit complete withdrawal and also insertion of the bayonet members in the manner just referred to. The apertures 33 are also preferably of sufficient size to permit insertion and removal of the abutments 28 and the springs 27.

At this point it is noted that the buffer construction normally maintains the draw-bar under tension and, with a view to facilitating uncoupling of the draw-bar or draw-bars and further with a view to simplifying insertion and removal of the springs or associated parts, a through-bolt 35 is provided. This bolt normally serves no function in the operation of the buffer but it may be inserted from a side of the buffer in the manner clearly shown in Figure 2 and a nut 36 abutting against one of the sleeves 29 drawn up so as to compress the springs 27. Upon compression of the springs, as will readily be apparent, the bayonet members 30 may easily be turned to the position in which they may be withdrawn, projections 30a being provided to facilitate turning (see Figure 4). After unlocking the bayonet, the springs together with the abutments 28 and the bolt 35 may be withdrawn laterally as a unit. The several parts may obviously be inserted or assembled by a reverse order of steps, and either operation is possible without the necessity of disconnecting draw-bars and, further, without the necessity of employing a separate engine brought around behind the tender to compress the buffer.

With regard to the matter of inserting or removing the springs, abutments and bayonet members, attention is called to a further feature of the construction which appears to best advantage in Figure 2. The bottom wall 39 of the buffer pocket is provided with an aperture 40a substantially centrally located. A block or tool may be inserted through this aperture between the wedges 24 so as to hold them in a separated position and thus facilitate insertion and removal of the bayonet locks when assembling the parts.

Figure 4:
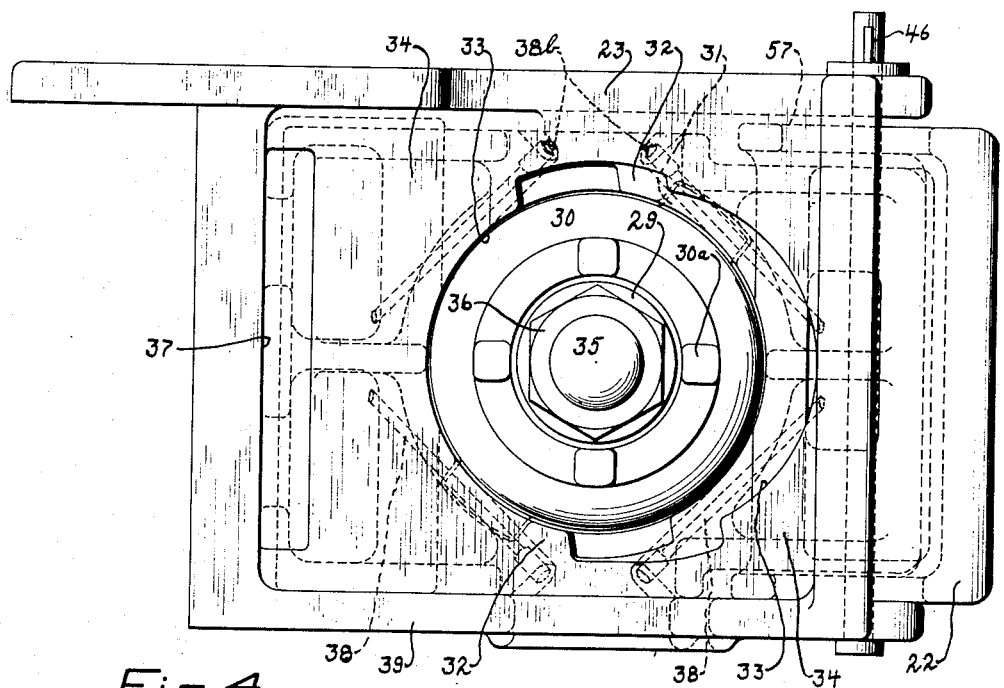
Figure 4 is an enlarged side elevational view of the construction shown in Figure 2.

The foregoing general arrangement also facilitates adjustment of the buffer pressure, since the pressure of the springs may be relieved from the wedges in the manner just described and shimming inserted at the base of the pocket structure behind wedge members 26 through aperture 37 formed in the side wall 34 of the buffer pocket (see Figures 2 and 4).

A further characteristic or feature of the arrangement shown is that the springs 27 are housed almost wholly within the wedges themselves, and this is of importance in reducing the overall lateral dimension of the buffer so as to meet certain clearance limitations which are commonly encountered, especially in the relatively large locomotives of modern practice and, further, in providing the increased area of wearing surface on the wedges without increasing the buffer dimensions.

Another characteristic which is mentioned at this point is the employment of wedges having inclined wedge surfaces on both sides thereof, i. e., at the front so as to cooperate with the rear face of the buffer member 22 and at the rear so as to cooperate with the wedge members 26. By this arrangement, a large wedge action is obtainable with a minimum lateral movement of the wedges themselves, and this is of importance in view of certain considerations to be mentioned more fully hereinafter, especially in connection with Figure 10, as well as in providing the desirable increase in wedge surfaces.

For purposes of lubrication, the present construction (see Figures 3 to 6 inclusive) provides lubricant passages or ducts 38 which extend through the body of the wedges upwardly from a central lower portion thereof substantially to the center of the several complementary wedge surfaces. Pressure lubricant fittings may be employed for the purpose of introducing oil or grease, or the ducts 38 may be threaded toward their entrance ends to receive the discharge nozzle of a pressure gun. In any event, the bottom wall 39 of the pocket structure is provided with suitable apertures such as indicated at 40 in Figure 3 to provide convenient access to the lubricant ducts.

Figure 5:
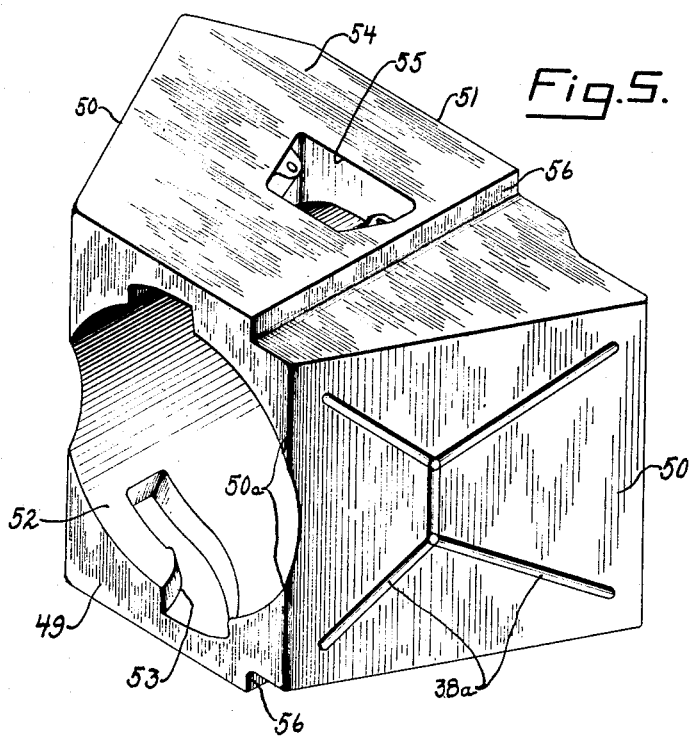
Figure 5 is an isometric view of one of the buffer wedge devices employed in accordance with this invention.
Figure 6:
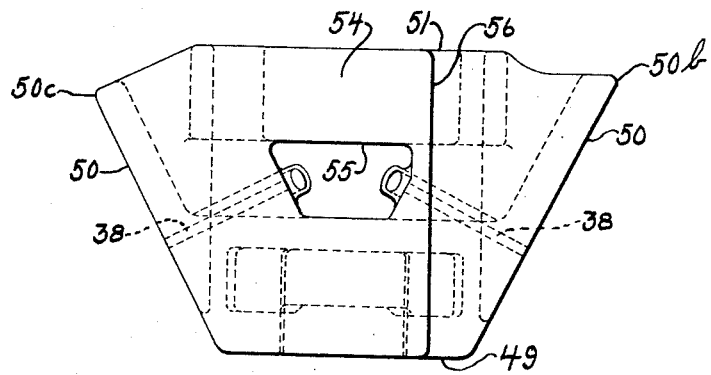
Figure 6 is a top plan view of the wedge shown in Figure 5.

The arrangement of the lubricant ducts and also the general configuration of the wedges will appear still more clearly from careful inspection of Figures 5 and 6. Here it will be seen that the ducts 38 serve to deliver lubricant to the distributing grooves 38a in the angled faces of the wedges. From various of the figures it will further appear that lubricant ducts are extended not only upwardly from the bottom of each wedge but also downwardly from the top thereof, when viewed, for example, as in Figure 3. However, lubrication would normally be effected only through the ducts extending downwardly, and the wedges have been constructed with ducts extended in both directions so that they may be inverted when positioned at opposite sides of the buffer. This, of course, is of advantage since oly one type of wedge block need be employed in any given buffer. The upper ducts are plugged as indicated at 38b in Figures 1, 3, 4, 8 and 9.

Turning again to Figures 5 and 6, the form of wedge incorporated in the buffer illustrated in Figures 1 to 4 is here shown as constituting an integral block-like member having the following various features of shape and the like. The end 49 of the block is, of course, the outer end from which the oppositely angled wedge surfaces 50 diverge inwardly toward the rear face 51. The spring receiving aperture 52 appears very clearly in Figure 5, and it will be noted that adjacent the outer face 49 a cutout portion 53 is provided in order to receive the projections 31 formed on the bayonet lock members 30 (see Figures 1 and 4). The top face 54 of the wedge (as well as the opposed bottom face thereof) is apertured as at 55 adjacent the inlet ends of the ducts 38, this construction being clearly shown in Figure 5. Still further, the top and bottom faces of the block are shouldered as shown at 56 in order to accommodate or receive the rearwardly extending top and bottom flanges 57 and 58 which are formed on the radial chafing or buffer member 22 (see Figures 1, 4 and 8). At this point mention is made of the fact that a positive stop for buffer compression is provided, when abnormal forces are encoutered, by the two wedge blocks 24 abutting against each other. This stop serves no function in normal service but is important in preventing the draw-bar from being placed under compression.

At this point a few additional features of the wedge block itself should be noted, reference again being made to Figures 5 and 6. As hereinbefore indicated, the wedging or wear surfaces of the present construction are very greatly increased over arrangements heretofore employed without, however, increasing the overall dimensions of the buffer. The increase in area of the wedging surfaces is obtained in several different ways. In the first place, the wedging surfaces 50 are carried outwardly above and below the central spring aperture 52 in the regions designated 50a in Figure 5 so that, in effect, the spring aperture is partially cut through the surfaces 50. Secondly, the inward edge 50b (see Figure 6) of the forward wedge surface 50 is extended well forwardly and inwardly, this being possible since no appreciable space need be left between the wedges of the pair incorporated in any buffer in view of other arrangements of the construction, including the fact that the buffer of this invention is worked out to have a resistance to compression of a substantially predetermined minimum value no less than the draw-bar pull of the locomotive. In normal service, therefore, the wedge blocks need not move toward and away from each other and only very slight clearance is necessary.

Still further, the inward edge portion 50c (see Figure 6) is carried well inwardly and rearwardly considerably beyond the point possible in prior buffer constructions. The principal reason why this is made possible lies in the use of separate wedge block members 26 (see Figure 2) in the rear corners of the pocket so that the rearward and inward extension of the surface 50c may be carried rearwardly very close to the base 25 of the pocket.

Still a further increase in wedge surface is obtained on the rear surface 50 by virtue of positioning the shoulders 56 well forwardly on the wedge blocks, this construction being in contrast with certain prior arrangements in which the upper and lower flanges 57 and 58 carried by the buffer member 22 extended rearwardly above and below the wedge blocks to a point at which the rear surfaces 50 were reduced in height.

Figure 6a shows certain features of the wedge block 26 which is positioned at the rear of the buffer pocket. It will be seen that this wedge has a surface 26a adapted to cooperate with one of the wedges 24. The wedge has a further face 26b angled with respect to the surface 26a and adapted to transmit buffing forces to the base of the pocket. A third surface 26c, in accordance with the present construction, provides for the transmission of some buffing forces to the side wall of the pocket. From inspection of Figure 6a, it will further appear that the corner of this wedge block between surfaces 26a and 26c is cut out as indicated at 26d for the purpose of permitting withdrawal of the supporting springs. Thus great wedge surface is afforded and at the same time spring removal is provided for.

In general, with regard to the area of the wedging surfaces, I have found that by the various features hereinbefore mentioned I have been enabled to increase the area very materially. Indeed, with a buffer of proportions suitable for modern high power locomotives I have been enabled to more than double the surface area as compared with buffers previously employed. By way of illustration I mention, as an example, an increase in one size buffer from approximately 175 square inches to approximately 356 square inches.

A further fact to which especial attention is now directed is that I have found that this extensive increase in area of the wear surfaces to a point which gives a wedge area at least as great as the area of the chafing block 21 (see Figures 1 and 2) results in a very marked decrease in wear on the wedge surfaces. The average floating or chafing block such as shown at 21 in Figures 1 and 2, for modern power, is roughly about 11¾ by 18 to 22 inches, and this block therefore has between about 221 and 258 square inches area.

The advantages of some of the features last mentioned are, of course, related to the fact that the very pronounced decrease in wear resulting from the increase of the wedge surface to a point beyond the surface of the chafing block, eliminates the necessity for making adjustments or replacements between normal inspection periods for the locomotive and, in general, very greatly lengthens the life of the buffer as a whole.

Figure 7:
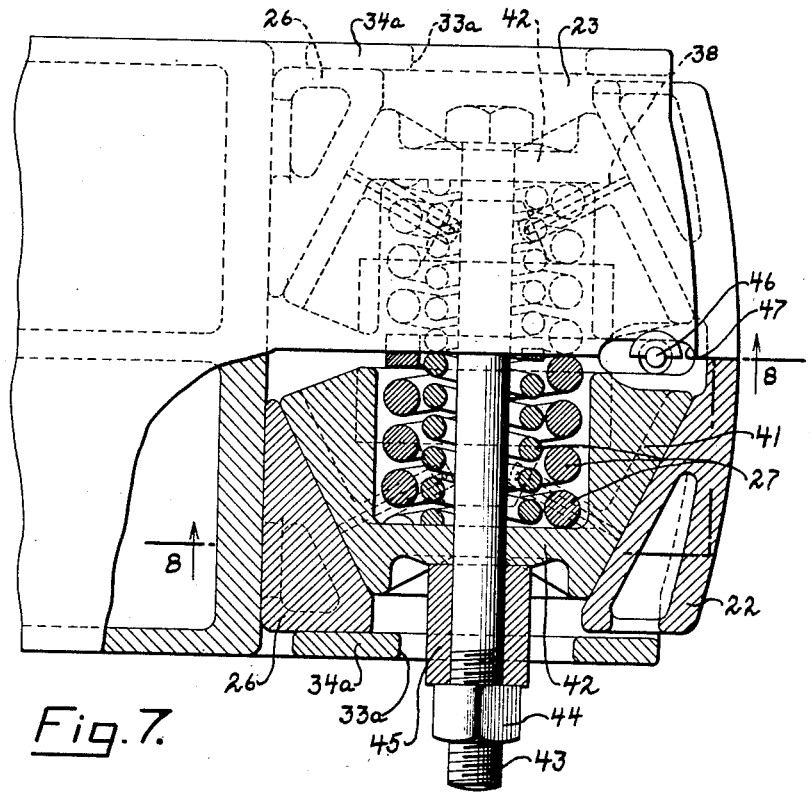
Figure 7 is a view similar to Figure 2 but showing a modified construction.
Figure 8:
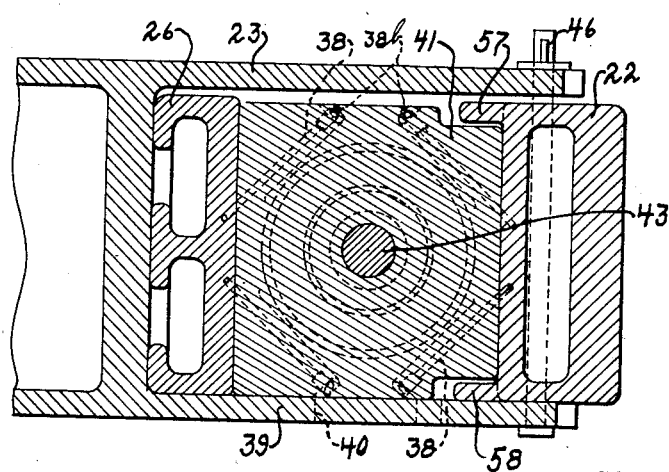
Figure 8 is a vertical sectional view taken as indicated by the line 8—8 on Figure 7.

In the modification of Figures 7 and 8, the buffer member 22 is again mounted in a pocket structure 23 at the base of which wedge members 26 are inserted. In this instance the main wedge members of the construction take a somewhat different form. These members are shown at 41, and it will at once be apparent that they have complementarily formed wedge surfaces coacting with the inclined surfaces of the blocks 26 and the buffer member 22. As before, springs 27 serve to urge the wedges 41 away from each other and thus advance the buffer member 22.

In the showing of Figures 7 and 8, however, the springs react directly against the disc-like portions 42 of the wedges. For the purpose of permitting assembly, disassembly, repair and the like of the buffer and also connection and disconnection of the drawbar, the side walls 34a of the buffer pocket are apertured as at 33a to permit insertion of a through-bolt 43 laterally through the buffer parts in the manner clearly shown in Figure 7. A tightening nut 44 is provided and a collar 45 is preferably interposed between the nut 44 and the adjacent wedge 41 so as to maintain convenient access to the nut when it is being employed. Upon tightening nut 44 the springs 27 are, of course, compressed between wedges 41 and, in this way, the pressure of the springs is taken off the buffer member 22. The draw-bar may now be connected or disconnected, and still further the buffer parts themselves may be removed, inspected or repaired by withdrawing the member 22 from the pocket 23 and thereafter withdrawing the wedges, springs and bolt as a unit out of the front opening of the pocket, after tipping or canting the unit. The aperture 33a in the lateral or side wall 34a of the pocket, while not necessarily as large as that provided in accordance with the arrangement of Figures 1 to 4 inclusive, is of sufficient dimension to permit the unit to be canted and withdrawn, as mentioned. If desired, the wedges and springs may also be removed out of the front of the pocket after the draw-bar has been uncoupled by again releasing the nut 44 and removing bolt 43. This is made possible by virtue of the fact that the free length of the springs is such that ample clearance is provided to draw all the parts directly forward out of the pocket. As appears in Figures 7 and 8, these wedge members are similarly provided with lubricant ducts 38 extended to the complementary wedge surfaces from a point adjacent the aperture 40 in the bottom wall 39 of the pocket.

Figure 9:
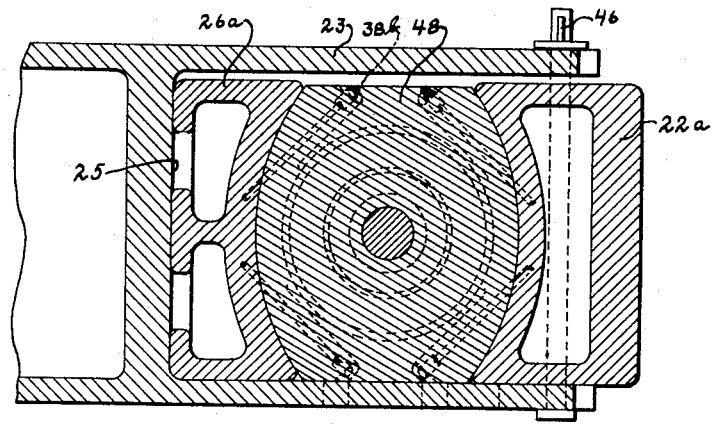
Figure 9 is a vertical sectional view similar to Figure 8 but showing a still further modified arrangement.

In the constructions of Figures 1 to 8 inclusive as well as of Figure 9, a pin 46 is preferably employed for the purpose of retaining the several buffer parts in the pocket structure. It is to be understood, however, that this pin in no way affects the normal buffer operation and is provided merely with a view to facilitating assembly of the parts. In this connection note that the top and bottom walls of the pocket structure have elongated apertures 47 through which the pin 46 extends. The pin may thus more forwardly and rearwardly with the buffer member 22 without affecting operation or taking any spring loads.

Figure 3:
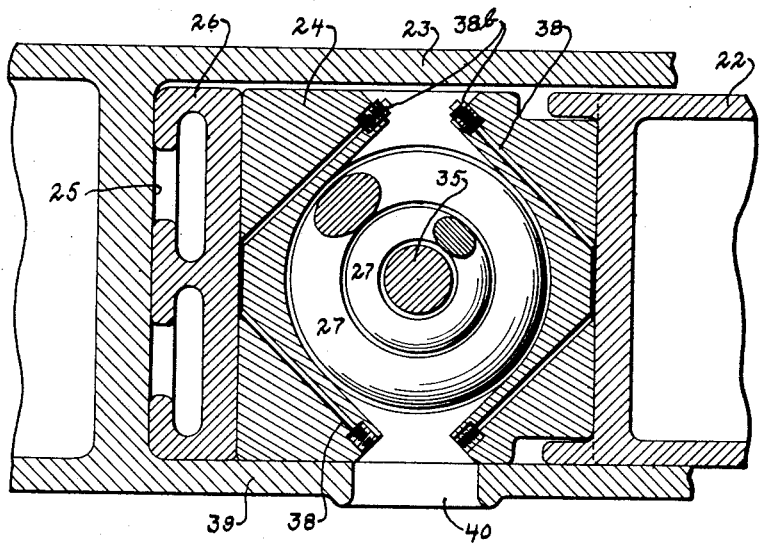
Figure 3 is an enlarged vertical sectional view through portions of the buffer mechanism shown in Figures 1 and 2, this view being taken as indicated by the section line 3—3 on Figure 2.

In Figure 9 is illustrated, in a manner similar to the showing of Figures 3 and 8, a portion of a still further modified buffer construction. In general, the parts remain substantially the same as various of those already described, but in this instance the wedge 48 is provided with wedge surfaces which are curved in a vertical direction and the buffer member 22a and the wedge members 26a are similarly provided with curved surfaces. An arrangement of this type is of advantage for the purpose of increasing the area of the friction surfaces even beyond that provided by the configuration of the wedges described above in connection with Figures 5 and 6, and thus correspondingly reducing the wear resulting from the wedge action and, still further, is of advantage since it provides a strong wedge construction even though the central aperture therein for receiving the spring means is of relatively large diameter. Thus, relatively large spring elements made be employed without increasing the overall wedge dimensions.

Figure 10:
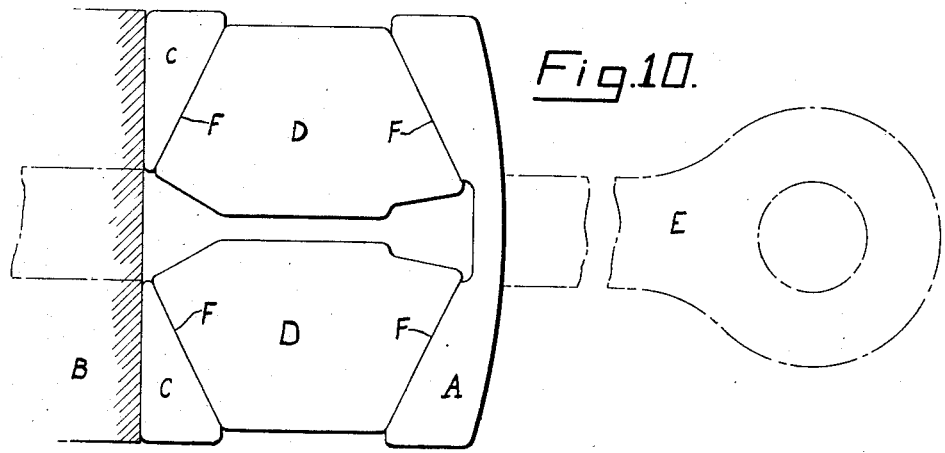
Figure 10 is a somewhat diagrammatic outline illustration of various buffer parts in connection with which certain principles of operation in accordance with this invention will be discussed.

Reference is now made to Figure 10 which will at once be recognized as showing a buffer member A, a rigid base B, wedge member C—C adjacent the base, and a pair of wedges D, all of which parts are superimposed over the diagrammatic representation of the draw-bar E. This view, of course, is purely diagrammatic and is so made for use in illustrating and describing certain characteristics of the present improvements. In the following discussion it must be borne in mind, of course, that the buffer mechanism diagrammatically shown normally reacts to place the draw-bar under tension.

Attention is now called to the fact that, in accordance with one of the most important features of the present invention, the reaction of the resilient means, such as the springs 27 hereinbefore described, together with the friction of the various cooperating wedge surfaces, is such that the buffer as a whole has sufficient resistance to compression to maintain (under all normal operating conditions of the locomotive) a much more uniform tension on the draw-bar than has been possible heretofore. In accordance with this feature, the buffer's resistance to compression is at least as great as the pull which the engine is capable of exerting. Thus, the spring pressure, the angularity of the wedge surfaces and the coefficient of friction of the wedge surfaces are arranged in a special manner with respect to the draft or pull of the engine.

To consider this matter further, assume first that the engine and tender are standing idle, with brakes released, so that the buffer reaction through the draw-bar may reach a state of equilibrium. In this condition the tension force exerted on the draw-bar will be substantially equal to the pressure exerted by the springs or whatvere resilient means is employed, and the drawbar, being to a certain degree elastic, will be slightly elongated.

When the buffer is subjected to a force having a tendency to compress it, the force being insufficient actually to effect compression (for example, during backward movement of the locomotive), there is a corresponding decrease of tension on the draw-bar. The resistance of the buffer as a whole to such a compression force is measured by the strength of the resilient or spring means plus the frictional reaction of the various wedge surfaces which are lettered F in Figure 10. It will at once be seen, therefore, that the resistance to compression is materially greater than the tension strain placed on the draw-bar when the parts are in a static condition, i. e., with no force applied having either a tendency to compress the buffer or to elongate it.

On the other hand, when an additional tension force is placed on the draw bar (for example, when the locomotive is pulling a train), the drawbar is subjected to elongation but, under these circumstances, the frictional reaction of the wedge surfaces F opposes the spring pressure and this frictional reaction must therefore be subtracted from the pressure of the springs in calculating the expansive force of the buffer which is being transmitted to the draw-bar.

When arranged in accordance with the foregoing, preferably with the resistance to compression of the buffer as a whole at a value no less than the normal draw-bar pull of the engine (which, for various reasons, I have found to be a very important relationship), the limits between which the draw-bar tension varies are brought relatively close together. This is of importance in eliminating wear on the draw-bar pins and the apertures in the draw-bar heads. At the same time, under no normal conditions of operation does the draw-bar become slack, and in consequence shocks to the draw-bar and the draw-bar pins are appreciably reduced.

Thus, by so constructing the buffer mechanism that its resistance to compression (measured by the reaction of the resilient means plus the frictional reaction of the wedge surfaces) is substantially equal to or greater than the normal pull of the engine which, of course, may be exerted either in pushing or pulling a train, the tension strain on the draw-bar is normally maintained at a relatively uniform predetermined value. Note also that when the engine is pulling a train, as in normal operation, the reaction of the friction surfaces F is subtracted from the reaction of the resilient wedge supporting means with the result that the total or net reaction of the buffer through the draw-bar is reduced and this at least partially compensates for the increase in tension caused by the pull of the engine.

In addition to the foregoing, the buffer mechanism, of course, also serves to cushion abnormal shocks, for example, in coupling cars. The buffer under such circumstances will actually yield and thus absorb the shocks, although the entire unit is preferably worked out to prevent compression of the buffer to a point at which the draw-bar is placed under compression.

From the foregoing it will be seen that while the present invention, in accordance with one of its important features, involves an appreciable increase in the resistance of the buffer as a whole to compression forces, at the same time, when the locomotive is pulling a heavy train, the strain on the draw-bar is not excessively increased.

It might also be mentioned that in accordance with the foregoing, the resistance to compression of the buffer is several times the expansive force tending to part the engine and tender.

To give a specific example of how the invention may be practiced, assume an engine capable of delivering 50,000 pounds draw-bar pull. With such equipment, the invention contemplates, in its preferred arrangement, a buffer whose resistance to compression (when the parts are in normal position with the springs at "working height") is substantially not less than 50,000 pounds and preferably somewhat above this value. This may be obtained by the use of resilient or spring means, the reaction of which (when under normal compression or at "working height") approximates 34,000 pounds and the arrangement of the wedges with surfaces such as those lettered F in Figure 10 each at an angle of approximately 26½° with respect to the transverse axis of the buffer, where the coefficient of friction at the surfaces F is from about .1 to .35. With such a spring and wedge arrangement the resistance to compression is in the neighborhood of 76,000 pounds, this value being well above the draw-bar pull in the example given.

The springs are also preferably arranged so that at the approximate point when the buffer "goes solid" under the influence of an excessive compression force (i. e. when the wedges abut against each other at the center of the buffer), the expansive effort of the springs alone will be in the neighborhood of or above the draw-bar pull of the engine. In the example referred to above and with the springs arranged as just mentioned, the spring force would approximate 53,000 pounds. Furthermore, in this example, the total resistance to compression at about the point where the wedges abut at the center would be in the neighborhood of 120,000 pounds.

As hereinbefore mentioned, the arrangement of the several buffer parts in the manner described very greatly reduces the rate of wear of relatively moving surfaces, especially on the wedges and the cooperating members. However, it will also be apparent that an appreciable amount of wear can take place with the buffer arranged in accordance with this invention without bringing the resistance to compression below the draw-bar pull. In the specific example given, wear can take place to an extent permitting the springs to expand about three-quarters of an inch before the resistance to compression drops below the draw-bar pull.

In conclusion, it is pointed out that the entire buffer structure of the present invention is so arranged as to facilitate adjustment thereof in order to compensate for wear and maintain the desired resistance to compression. Parts of the buffer may also be very readily renewed or removed for purposes of inspection or replacement. In fact, most adjustments, replacements or the like may readily be made laterally between the engine and tender without disconnecting the draw-bar. The removable abutments and the bayonet locks, of course, serve this purpose. Additionally, the construction provides for the handling of the springs, which must necessarily have relatively great strength, as a unit, either between abutments as in the form of construction illustrated more particularly in Figures 1 to 6 inclusive or between the wedges themselves as in the construction of Figures 7 and 8.
A further advantageous feature is involved in the use of separate wedge blocks such as those designated by the numeral 26 in all of the figures and shown in greater detail in Figure 6a. These blocks distribute the reaction of the wedges against the base of the pocket structure and against the lateral side walls of the pocket, and the arrangement is further of importance in removing wear from the base of the pocket which is frequently formed integrally with the frame or sill of the tender as shown most clearly in Figures 7 and 8. An additional advantage is involved in maintaining the overall dimension of the buffer lengthwise of the engine and tender at a minimum while permitting rearward and inward extension of the cooperating wedge surfaces on the blocks 26 and the wedges (24, 41 or 48 in accordance with the form employed) so as to increase the area of the relatively moving or wearing surfaces. In this connection it will be noted that with separate blocks disposed in the rear corners of the buffer pocket the wedge members themselves may project very close to the base of the pocket in the central region thereof. Similarly, the disposition and angularity of the movable wedges permits increasing the area of the wearing surfaces while maintaining the width of the buffer within standard or permissible lateral clearance limitations. The double angularity of the wedge surfaces on each wedge also provides for minimum fore and aft movement of the wedge during buffer operation, and all of the features just referred to are of importance in meeting certain clearance limitations which are encountered and, at the same time, providing a structure which is capable of affording the necessary buffing action.

Still another feature of importance is involved in the arrangements which provide for lubrication of the relatively movable wedge surfaces. The buffer mechanism, of course, is normally positioned at a level below the deck plate of the engine. For this reason lubrication has heretofore been very difficult but, in accordance with the present arrangement, with the lubricant ducts arranged as already described and with the bottom wall of the pocket apertured, the lubricant may very conveniently be delivered to the supply or distributing ducts. Pressure fitting, as hereinbefore mentioned, may be used for introducing the grease or oil.
Two of the outstanding characteristics of the present invention (increased wedge surface and increased resistance to compression) are related to each other in a special way in view of the fact that by arranging the buffer parts to afford resistance to compression at least as great as the pull of the engine, much less wedge movement is necessary and, as a result, the central clearances between the opposed wedges may be reduced or, stated in another way, the wedging surfaces may be extended inwardly in order to increase the total area of wedging surface without increasing the overall dimensions of the buffer, especially laterally of the vehicles.

I claim:—

1. Buffer mechanism for use between an engine and its tender having a draw-bar interconnection including cooperating buffer members between the engine and tender, a buffer pocket structure on one of the vehicles adapted to mount one of the buffer members, yielding supporting means behind said one buffer member in said pocket structure adapted to urge it toward the other and thus place the draw-bar under tension, said means including a pair of wedges mounted for movement in a direction generally transverse the direction of movement of said one buffer member, the wedges having wedge surfaces arranged to advance the said one buffer member toward the other vehicle upon movement of the wedges away from each other, resilient means adapted to react between the wedges to urge them away from each other, and a removable abutment interposed between the resilient means and one of said wedges, the pocket structure being apertured adjacent said abutment to permit withdrawal thereof, whereby, upon removal of the abutment, the force of the resilient means may be removed from the wedges.

2. Buffer mechanism for use between an engine and its tender having a draw-bar interconnection including cooperating buffer members between the engine and tender, a buffer pocket structure on one of the vehicles adapted to mount one of the buffer members, yielding supporting means behind said one buffer member in said pocket structure adapted to urge it toward the other and thus place the draw-bar under tension, said means including a pair of wedges mounted for movement in a direction generally transverse the direction of movement of said one buffer member, the wedges having wedge surfaces arranged to advance the said one buffer member toward the other vehicle upon movement of the wedges away from each other, resilient means adapted to react between the wedges to urge them away from each other, a removable abutment interposed between the resilient means and one of said wedges, the pocket structure being apertured adjacent said abutment to permit withdrawal thereof, whereby, upon removal of the abutment, the force of the resilient means may be removed from the wedges, and a device for removing the force or pressure of the resilient means from the abutment to facilitate removal thereof.

3. A wedge block for use in an engine-tender buffer, said block being invertible for alternative use in either one of two positions and having upper and lower substantially parallel faces, having relatively angled wedge faces at the sides thereof converging toward one end of the block, having an aperture adapted to receive cooperating resilient means, and having at least a pair of lubricant ducts formed in the wall of the block between one of said angled surfaces and said aperture, one of said ducts having an inlet opening through the top face of the block and an outlet opening through one of said wedge surfaces and the other of said ducts having an inlet opening through the lower face of the block and an outlet opening through the wedge surface last mentioned.

4. In buffer mechanism of the character described, a separately handleable spring assembly arranged for unitary insertion in and removal from a buffer, said assembly including a coil spring, an annular abutment at each end of the spring, a collar or sleeve at each end of the spring beyond the abutments, and a bolt passing through the spring lengthwise thereof and through the abutments and collars and having a head at one end thereof adapted to abut against one of said collars and a nut threaded on to the other end thereof and adapted to abut against the other of said collars, whereby the spring may be compressed to facilitate insertion and removal thereof and convenient access may be had to the bolt head and nut when the assembly is positioned in a buffer.

5. In a buffer structure for use between connected vehicles, a buffing plate mounted on one of the vehicles with freedom for movement toward and away from the connected vehicle, a pair of wedges mounted in end to end relation behind said plate and provided with angled wedge surfaces adapted to cooperate with complementary wedge surfaces behind said plate and on the vehicle on which it is mounted, said wedges being provided with aligned apertures therein, the aperture in one wedge opening through the outside end wall thereof, spring means positioned within said apertures, a removable abutment closing said end wall opening and transmitting the force of said spring to the wedge, and normally inoperative means adapted to remove the spring pressure from the abutment to facilitate removal thereof.

6. Buffer mechanism for use between an engine and its tender having a draw-bar interconnection, the buffer mechanism being positioned between the engine and tender frames and including means for expanding the buffer to place the draw-bar under tension, said means including a pair of wedges arranged end to end and mounted for movement toward and away from each other in a direction generally transverse the engine and tender, the wedges having angled wedge surfaces adapted to expand the buffer mechanism upon movement of the wedges away from each other, resilient means adapted to react between the wedges to urge them away from each other, one of the wedges being apertured to permit insertion and removal of the resilient means, and an abutment interposed between said resilient means and one of the wedges and through which the action of the resilient means is normally transmitted to the wedge, the abutment being removable without disassembling the wedges and resilient means.

7. Buffer mechanism for use between an engine and its tender having a draw-bar interconnection, the buffer mechanism being positioned between the engine and tender frames and including means for expanding the buffer to place the draw-bar under tension, said means including a pair of wedges arranged end to end and mounted for movement toward and away from each other in a direction generally transverse the engine and tender, the wedges having angled wedge surfaces adapted to expand the buffer upon movement of the wedges away from each other, resilient means adapted to react between the wedges to urge them away from each other, one of the wedges being apertured in its outer end to permit insertion and removal of the resilient means, and an abutment interposed between the resilient means and the apertured wedge and through which the action of the resilient means is normally transmitted to the wedge, the abutment being removable without disassembling the resilient means and the wedges.

8. Buffer mechanism for use between an engine and its tender having a draw-bar interconnection, the buffer mechanism being positioned between the engine and tender frames and including means for expanding the buffer to place the draw-bar under tension, said means including a pair of wedges arranged end to end and mounted for movement toward and away from each other in a direction generally transverse the engine and tender, the wedges having angled wedge surfaces adapted to expand the buffer upon movement of the wedges away from each other, resilient means adapted to react between the wedges to urge them away from each other, one of the wedges being apertured to permit insertion and removal of the resilient means, an abutment interposed between said resilient means and one of the wedges and through which the action of the resilient means is normally transmitted to the wedge, the abutment being removable without disassembling the wedges and resilient means, and a normally inoperative device for removing the pressure of the resilient means from said abutment to facilitate removal thereof.

9. In a buffer structure for use between connected vehicles, a resiliently expansible mechanism positioned between the vehicle frames and including a pair of wedges arranged end to end and adapted to move toward and away from each other, said wedges being provided with aligned apertures therein, the aperture in one wedge opening through the outside end wall thereof, spring means positioned within said apertures, and a removable abutment closing said end wall opening and transmitting the force of said spring to the wedge.

10. In a buffer structure for use between connected vehicles, a resiliently expansible mechanism positioned between the vehicle frames and including a pair of relatively movable and telescopic members, a pair of wedges arranged in end to end relation and housed within the outer telescopic member, the wedges being mounted to move toward and away from each other and provided with angled wedge surfaces adapted to cooperate with complementary wedge surfaces formed on said members, said wedges further being provided with aligned apertures, the aperture in one wedge opening through the outside end wall thereof, spring means positioned within said apertures, and a removable abutment closing said end wall opening and transmitting the force of said spring to the wedge, the side wall of the outer telescopic member being apertured adjacent said abutment for access thereto.

11. In a buffer structure for use between connected vehicles, a resiliently expansible mechanism positioned between the vehicle frames and including a pair of wedges arranged in end to end relation and mounted for movement toward and away from each other, said wedges being provided with aligned apertures therein, the aperture in one wedge opening through the outside end wall thereof, spring means positioned within said apertures, a removable abutment closing said end wall opening and transmitting the force of said spring to the wedge, a member between the spring and the removable abutment through which the pressure of the spring is normally transmitted, and normally inoperative means adapted to cooperate with said member for removing the spring pressure from the abutment to facilitate removal thereof.

12. For an engine-tender buffer of the type employing a wedge block, cooperating resilient means and a removable abutment through which the force of the resilient means is normally transmitted to the wedge block; a wedge block having relatively angled wedge surfaces converging toward one end thereof, having an aperture therein adapted to receive cooperating resilient means, and further having means formed thereon and configured to interlock with a complementarily configured abutment through which the force of the resilient means is adapted to be transmitted to the wedge.

13. For an engine-tender buffer of the type employing a wedge block, cooperating resilient means and a removable abutment through which the force of the resilient means is normally transmitted to the wedge block; a wedge block having relatively angled wedge surfaces converging toward one end thereof, having an aperture therein adapted to receive cooperating resilient means, and further having means formed thereon and configured to interlock with a complementarily configured abutment through which the force of the resilient means is adapted to be transmitted to the wedge, said interlocking means being formed as a recess in a wall of said aperture.

14. For an engine-tender buffer of the type employing a wedge block, cooperating resilient means and a removable abutment through which the force of the resilient means is normally transmitted to the wedge block; a wedge block having relatively angled wedge surfaces converging toward one end thereof, having a cylindrical aperture therein adapted to receive cooperating resilient means, and further having means formed thereon and configured to interlock with a complementarily configured abutment through which the force of the resilient means is adapted to be transmitted to the wedge, said interlocking means comprising a deformation of the inside cylindrical wall of said aperture.

15. For an engine-tender buffer of the type employing a wedge block, cooperating resilient means and a removable abutment through which the force of the resilient means is normally transmitted to the wedge block; a wedge block having relatively angled wedge surfaces converging toward one end thereof, having an aperture therein located between said wedge surfaces and opening at opposite ends through the end walls of the block, the aperture being adapted to receive cooperating resilient means and having a recess in the wall thereof configured to interlock with a complementarily configured abutment through which the force of the resilient means is adapted to be transmitted to the block.

16. For an engine-tender buffer of the type incorporating wedge blocks and cooperating resilient means, a wedge block having relatively angled wedge surfaces at the sides thereof converging toward one end of the block, which surfaces are convexly curved from the top to the bottom of the block, and the block having a substantially cylindrical bore extended therethrough for the reception of cooperating resilient means, the bore being formed with its axis arranged endwise of the block and opening through both ends thereof.

GEORGE H. ZOUCK.